United States Patent
Sharma et al.

(10) Patent No.: US 8,151,253 B2
(45) Date of Patent: Apr. 3, 2012

(54) EFFICIENT GENERATION OF EXECUTABLE FILE FROM PROGRAM FILES WHEN SOME OF THE PROGRAM FILES EXPRESSLY INCORPORATE OTHER PROGRAM FILES

(75) Inventors: Mrinal Sharma, Haryana (IN); Shelendra Singh, Aligarh (IN); Vivek Sam Sunder Raj, KK Dist (TN) (IN)

(73) Assignee: Oracle International Corporation, Redwood Shores, CA (US)

( * ) Notice: Subject to any disclaimer, the term of this patent is extended or adjusted under 35 U.S.C. 154(b) by 1547 days.

(21) Appl. No.: 11/308,800

(22) Filed: May 9, 2006

(65) Prior Publication Data
US 2007/0226710 A1    Sep. 27, 2007

(51) Int. Cl.
*G06F 9/44* (2006.01)
*G06F 9/45* (2006.01)

(52) U.S. Cl. ......... 717/145; 717/111; 717/121; 717/143

(58) Field of Classification Search .................. None
See application file for complete search history.

(56) References Cited

U.S. PATENT DOCUMENTS

| | | | | |
|---|---|---|---|---|
| 5,375,239 A | * | 12/1994 | Mortson ........................ | 717/140 |
| 5,526,517 A | * | 6/1996 | Jones et al. ................... | 1/1 |
| 5,692,196 A | * | 11/1997 | Unni et al. .................... | 717/145 |
| 5,854,932 A | * | 12/1998 | Mariani et al. ................ | 717/116 |
| 5,923,880 A | * | 7/1999 | Rose et al. ..................... | 717/145 |
| 5,978,585 A | * | 11/1999 | Crelier ........................... | 717/145 |
| 6,654,954 B1 | * | 11/2003 | Hicks ............................. | 717/162 |
| 6,804,682 B1 | * | 10/2004 | Kemper et al. ............... | 1/1 |
| 2003/0014740 A1 | * | 1/2003 | Aubertine ..................... | 717/154 |
| 2003/0163799 A1 | * | 8/2003 | Vasilik et al. ................. | 717/100 |
| 2004/0193661 A1 | * | 9/2004 | Sikchi et al. .................. | 707/205 |
| 2004/0194060 A1 | * | 9/2004 | Ousterhout et al. .......... | 717/120 |
| 2004/0205736 A1 | * | 10/2004 | Mitsumori et al. ........... | 717/142 |
| 2005/0216923 A1 | * | 9/2005 | Krebs ............................ | 719/331 |
| 2007/0055963 A1 | * | 3/2007 | Waddington et al. ......... | 717/140 |
| 2007/0100903 A1 | * | 5/2007 | Cherry .......................... | 707/201 |

OTHER PUBLICATIONS

Joe Farah; "Moving Dependency Tracking Into the CM Process", downloaded from http://www.cmcrossroads.com/boards/showflat-Number-32805-page-0-view-collapsed-sb-11-o-fpart-1, Sep. 20, 2004.

* cited by examiner

*Primary Examiner* — Isaac Tecklu
(74) *Attorney, Agent, or Firm* — Narendra Reddy Thappeta

(57) ABSTRACT

Efficient generation of executable file from program files when some of the program files expressly incorporate other program files. In an embodiment, dependency information representing which program files (conditionally or unconditionally) incorporate other program files is generated and stored in a secondary (non-volatile) storage. When some program files are modified, the dependency information is used to identify for recompilation all the program files that incorporate any of the modified program files. The modified program files and the identified program files are recompiled and the executable file is regenerated.

11 Claims, 6 Drawing Sheets

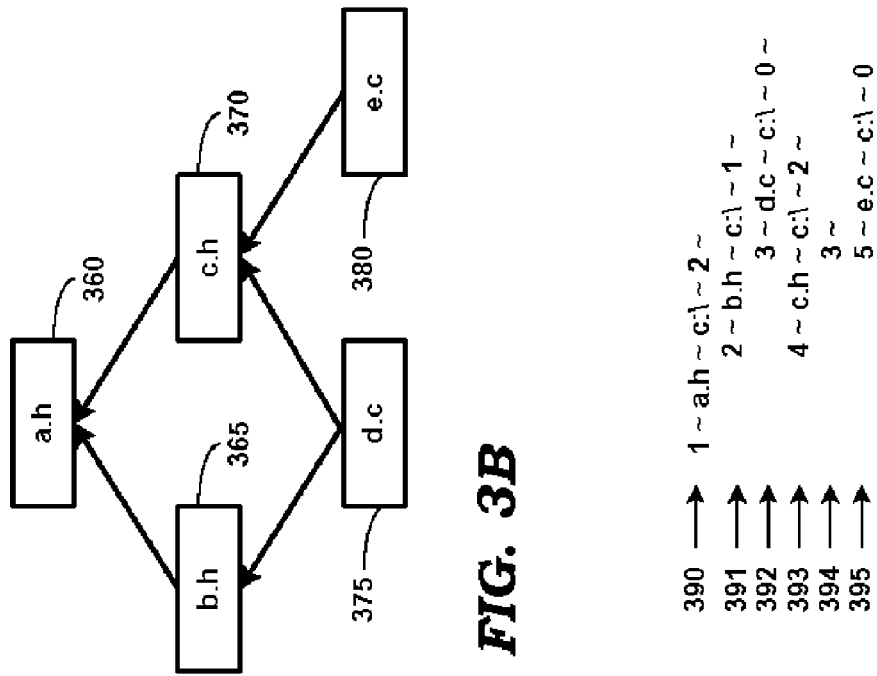
FIG. 3B
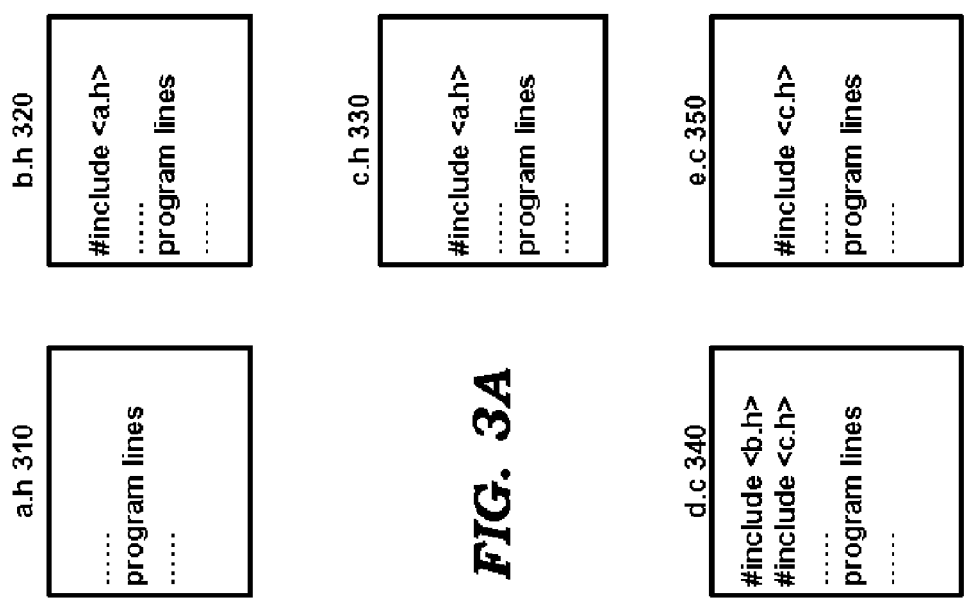
FIG. 3A
FIG. 3C

EFFICIENT GENERATION OF EXECUTABLE FILE FROM PROGRAM FILES WHEN SOME OF THE PROGRAM FILES EXPRESSLY INCORPORATE OTHER PROGRAM FILES

RELATED APPLICATIONS

The present application is related to and claims priority from the co-pending India Patent Application entitled, "Efficient Generation of Executable File From Program Files When Some of the Program Files Expressly Incorporate Other Program Files", Serial Number: 548/CHE/2006, Filed: Mar. 27, 2006, naming the same inventors as in the subject patent application.

BACKGROUND OF THE INVENTION

1. Field of the Invention

The present invention relates to software, and more specifically to a method and apparatus to generate an executable file from program files when some of the program files expressly incorporate other program files.

2. Related Art

A program file is typically represented as text containing a list of instructions in a programming language. Large program files may be split into a number of smaller program files for separating functionality, providing modularity and/or for ease of usage, as is well understood in the relevant arts.

In general, instructions are provided by the programming language using which program files can be expressly incorporated into one another—thereby effectively designed for operation as one large program file. For convenience, the file incorporating another file is referred to as an "incorporating file" and the file being incorporated is referred to as an "incorporated file".

An example of such a programming language is C programming language where large program files can be split into header and source files. The C programming language provides a construct "#include <filename>" by which one header or source file can expressly incorporate another header or source file. Typically, source files ending with extension ".c" incorporate header files ending with extension ".h".

Program files need to be converted into an executable file before they can be executed by the underlying hardware. The executable file generally contains instructions (typically in binary form) suitable for execution by the processors contained in the hardware.

The process of generating an executable file from program files typically consists of converting (or compiling) each program file into a compiled file using a compiler of the programming language and then building the executable file from the compiled files. Building generally entails linking the compiled filed into an executable file noted above.

Typically, an executable file is generated from a large number of program files. As such, a change made in one of the program files may necessitate the recompilation of all the program files, which is not desirable. Various approaches have been proposed for increasing the efficiency of generating an executable file from program files.

In one prior approach, a program file is recompiled only when the modification date of a program file (as maintained by the underlying operating system) is more recent than the modification date of its corresponding compiled file. Such an approach is used in utilities such as 'make' and 'gmake' well known in Unix type environments and 'nmake' well known in Windows type environments.

One disadvantage with such an approach is that consideration of modification date alone may not lead to efficient generation of accurate executable file since incorporating files need to be recompiled if the incorporated files are modified. Various aspects of the present invention overcome such deficiencies as described in sections below.

What is therefore needed is an approach, which enables the efficient generation of an executable file from program files while addressing one or more problems/requirements described above.

BRIEF DESCRIPTION OF THE DRAWINGS

The present invention will be described with reference to the accompanying drawings briefly described below.

FIG. 3A depicts the contents of some program files used to generate an executable file in an example scenario according to some aspects of the present invention.

FIG. 3B depicts a hierarchy representation of the dependency information generated by parsing the program files of FIG. 3A.

FIG. 3C depicts the contents of a file stored in secondary storage containing the dependency information generated from the program files of FIG. 3A.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

An aspect of the present invention generates an executable file accurately from program files by using dependency information between incorporated files and incorporating files. The dependency information is generated by parsing the program files and is stored in secondary storage. On receiving an indication that a program file has been modified, the dependency information is retrieved from secondary storage and is used to identify for recompilation all the incorporating files that incorporate (directly or indirectly) the modified program file. By recompiling all the incorporating files along with the modified program file, the executable file can be generated accurately.

Another aspect of the present invention generates an executable file accurately when the program files are conditionally incorporated. Data representing each condition is stored associated with each file in which the condition is present. In an embodiment, the result of evaluation of a condition depends on whether a flag (part of the condition) is defined or not, and data representing the specific flags which are defined is also received. On receiving an indication that a program file has been modified, the conditions associated with the program files are evaluated (based on the flag information in the noted embodiment), and used to identify the incorporating files which have to be recompiled for accurately generating the executable file.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Digital Processing System

Figure 1:
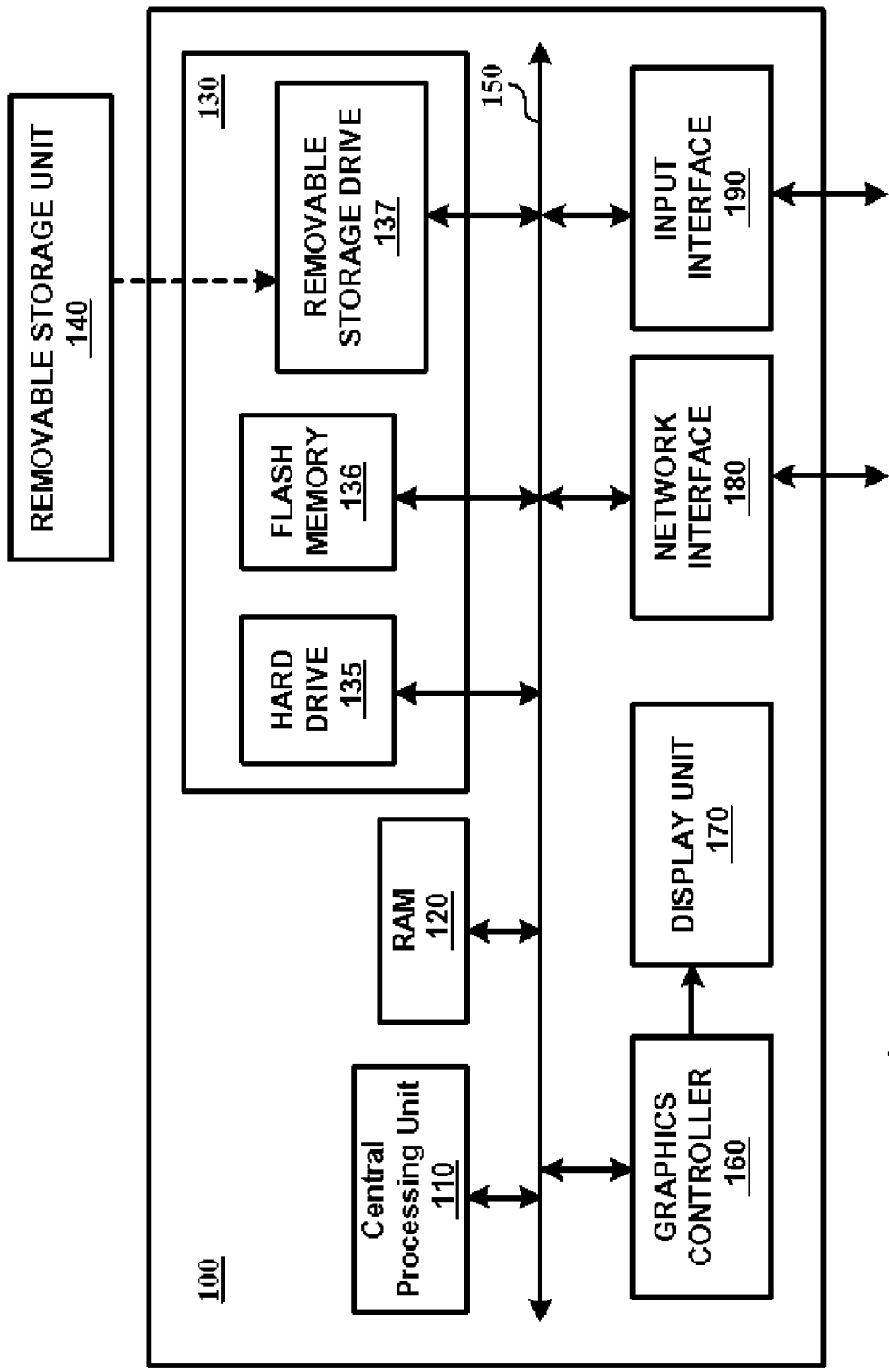
FIG. 1 is a block diagram illustrating the details of a digital processing system in which various aspects of the present invention are operative by execution of appropriate software instructions.

FIG. 1 is a block diagram illustrating the details of digital processing system 100 in which various aspects of the present invention are operative by execution of appropriate software instructions. Digital processing system 100 may contain one or more processors such as central processing unit (CPU) 110, random access memory (RAM) 120, secondary memory 130, graphics controller 160, display unit 170, network interface 180, and input interface 190. All the components except display unit 170 may communicate with each other over communication path 150, which may contain several buses as is well known in the relevant arts. The components of FIG. 1 are described below in further detail.

CPU 110 may execute instructions stored in RAM 120 to provide several features of the present invention described in the present application. CPU 110 may contain multiple processing units, with each processing unit potentially being designed for a specific task. Alternatively, CPU 110 may contain only a single general purpose-processing unit. RAM 120 may receive instructions from secondary memory 130 using communication path 150.

Graphics controller 160 generates display signals (e.g., in RGB format) to display unit 170 based on data/instructions received from CPU 110. Display unit 170 contains a display screen to display the images defined by the display signals. Display unit 170 may be used to display the dependency information (described below) stored in secondary memory 130. Input interface 190 may correspond to a key-board and/or mouse. Network interface 180 provides connectivity to a network and may be used to communicate with other external systems.

Secondary memory 130 may contain hard drive 135; flash memory 136 and removable storage drive 137. Some or all of the data and instructions may be provided on removable storage unit 140, and the data and instructions may be read and provided by removable storage drive 137 to CPU 110. Secondary memory 130 may be used to store the dependency information generated from the program files (also potentially stored in secondary memory 130). Floppy drive, magnetic tape drive, CD-ROM drive, DVD Drive, Flash memory, removable memory chip (PCMCIA Card, EPROM) are examples of such removable storage drive 137.

Removable storage unit 140 may be implemented using medium and storage format compatible with removable storage drive 137 such that removable storage drive 137 can read the data and instructions. Thus, removable storage unit 140 includes a computer readable storage medium having stored therein computer software and/or data.

In this document, the term "computer program product" is used to generally refer to removable storage unit 140 or hard disk installed in hard drive 135. These computer program products are means for providing software to digital processing system 100. CPU 110 may retrieve the software instructions, and execute the instructions to provide various features of the present invention described below.

3. Generating an Executable File

Figure 2:
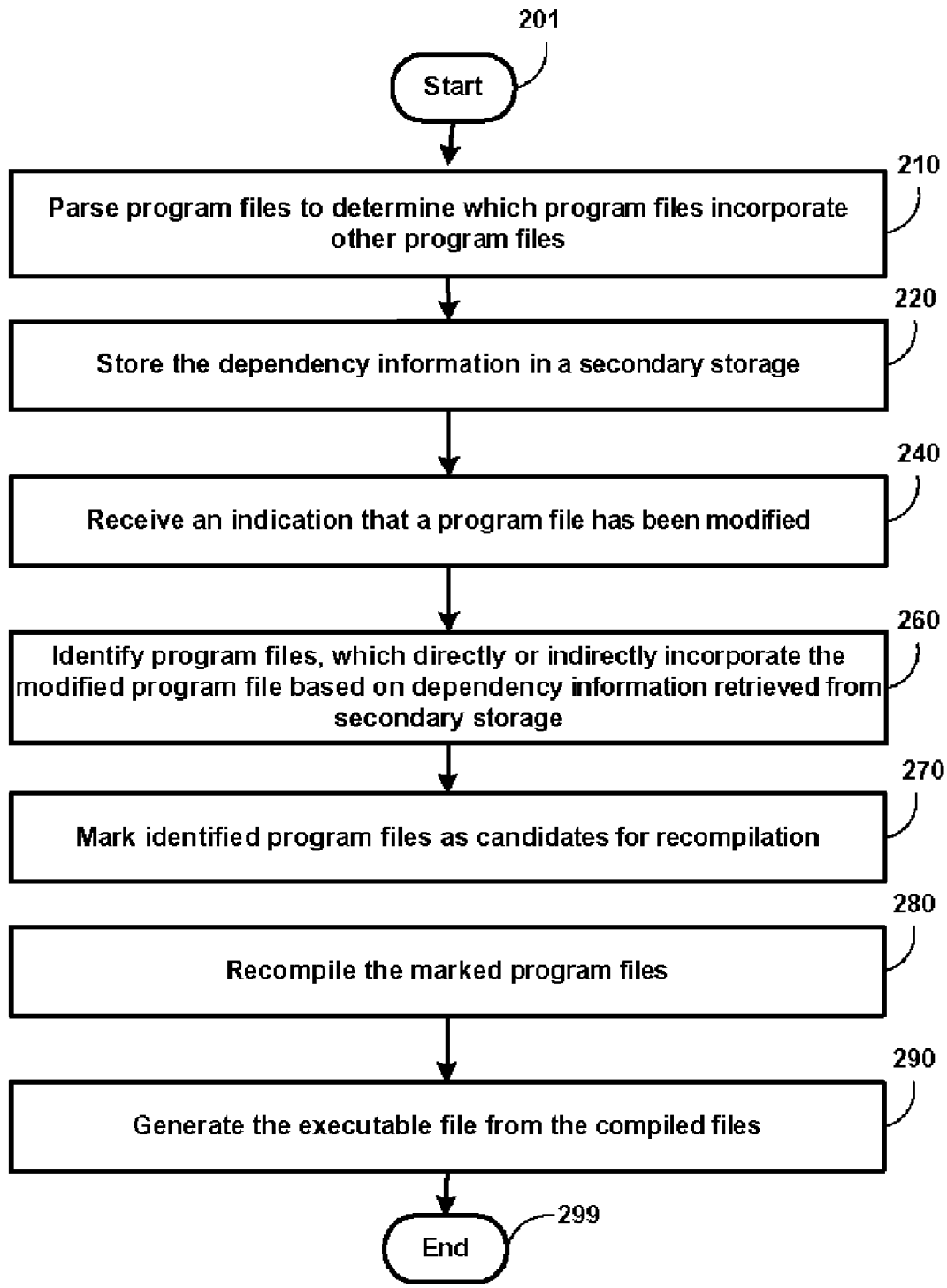
FIG. 2 is a flowchart illustrating the manner in which an executable file can be generated from program files wherein some of the program files expressly incorporate other program files according to an aspect of the present invention.

FIG. 2 is a flowchart illustrating the manner in which an executable file can be generated from program files wherein some of the program files expressly incorporate other program files according to an aspect of the present invention. The flowchart is described with respect to the system of FIG. 1 merely for illustration. However, the features can be implemented in various other environments without departing from the scope and spirit of the present invention. The flowchart begins in step 201, in which control passes to step 210.

In step 210, CPU 110 parses each of the program files read from secondary memory 130 and determines dependency information representing which program files incorporate other program files. In an embodiment, CPU 110 parses each of the program files written in the C programming language to identify all the "#include <filename>" instructions and determines that the parsed program file incorporates all the "filename" program files.

In step 220, CPU 110 stores the dependency information in secondary memory 130. The dependency information can be stored in any form. An example form/format is described in sections below.

In step 240, CPU 110 receives an indication that a program file has been modified. In an embodiment, this indication may be in the form of a list of file names and may be received from a source control program (which keeps track of the modifications related information).

In step 260, CPU 110 identifies program files, which directly (incorporating files) or indirectly (i.e., files incorporating an identified incorporating file) incorporate the modified program file based on the dependency information retrieved from secondary memory 130.

In step 270, CPU 110 marks each of the identified program files as candidates for recompilation. In an embodiment, the marking may be done by changing the modified date (in the underlying operating system) of the identified program files, which would automatically cause the recompilation of the identified program files.

In step 280, CPU 110 recompiles all the marked program files to generate the corresponding compiled files. In a Unix environment where C-programming language is used, object files with extension ".o" are generated from the header and source files.

In step 290, CPU 110 generates the executable file from the compiled files of all the program files. Due to the recompilation of the incorporating files when the corresponding incorporated file is modified, an accurate executable file can be generated. The flowchart ends in step 299.

It may be appreciated that the storage of dependency information in secondary storage facilitates the reuse of the dependency information, other than the efficient generation of an executable file. In an example, the dependency information may be used to analyze the impact of changing a program file by identifying all the program files that are affected due to the change. The files that need to be recompiled (and/or a count thereof) may be displayed to a user in response to receiving an identifier (e.g., file name) of a program file of interest. As such, a user may interactively provide several identifiers to check the relative impact of changing each program file, and decide to change program files which would cause least impact if there is a choice of modifying one of several program files to achieve a given objective.

In another example, statistics concerning the program files like the number of dependent/independent files, cross-incorporated files, and cyclic incorporation among the program files may be generated using the dependency information. The features of FIG. 2 are illustrated with an example below.

4. Example

FIG. 3A depicts the contents of some program files used to generate an executable file in an example scenario according to some aspects of the present invention. The figure contains program files a.h 310, b.h 320, c.h 330, d.c 340 and e.c 350 containing instructions written in C programming language.

File b.h 320 contains the instruction "#include <a.h>" implying that the contents of file a.h 310 must be expressly incorporated into file b.h 320 thereby specifying a dependency of file b.h 320 (incorporating file) on file a.h 310 (incorporated file). Any modification made to file a.h 310 necessitates the recompilation of ".c" files incorporating file b.h 320, since b.h 320 is a header file. Similarly, file c.h 330 depends on file a.h 310 and file e.c 350 depends on file c.h 330. File d.c 340 contains two "#include" instructions by which the contents of files b.h 320 and c.h 330 are expressly incorporated thereby specifying a dependency of file d.c 340 on both files b.h 320 and c.h 330.

FIG. 3B depicts a hierarchy representation of the dependency information generated by parsing the program files of FIG. 3A. As will be clearer from the description below, such a view may be generated from the data representation of FIG. 3C while performing step 240 in one embodiment. The figure contains nodes a.h 360, b.h 365, c.h 370, d.c 375 and e.c 380. The hierarchy is generated from the dependency information by depicting each program file as a node in the hierarchy, and all the "filename" program files (incorporated files) as parents to the node, making the incorporating file as a child node to all the incorporated files.

In relation to FIG. 3A, the same file name (with .h or .c extension) is repeated in FIG. 3B, but a different number is conveniently chosen. Thus, file b.h 320 is represented as node b.h 365 in the hierarchy. The file a.h 310 that is expressly incorporated by file b.h 320 is represented as node a.h 360, a parent of node b.h 365. The parent relationship is represented as an arrow directed from node b.h 365 to node a.h 360. Similarly, node c.h 370 representing file c.h 330 is made a child of node a.h 360 and node e.c 380 is made a child of node c.h 370.

FIG. 3C depicts the contents of a file stored in secondary storage containing the dependency information generated from the program files of FIG. 3A. The dependency information can be stored in secondary storage using different formats. An example format is illustrated with reference to FIG. 3C. As will be appreciated from the description, the hierarchy of FIG. 3B is represented in a depth first manner.

Each node of the hierarchy of FIG. 3B is represented using a unique identification number, following which the file name, the file path, the number of children and the details of each child is stored as fields using a delimiter between the fields. Thus, line 391 represents node b.h 365 and is stored with its unique identification number (2), the file name ("b.h"), the file path ("c:\") in the underlying operating system, and the number of children (1) using the delimiter ("~"). As the number of children is 1, the details of the 1 child node are stored (Line 392).

Once the details of a node have been stored, the node is referred using its unique identification number. For example, in Line 394, unique identification number 3 is used to refer to the node whose details are stored in Line 392. In general, the formats need to enable the dependency information to be reconstructed as a hierarchy (of FIG. 3B).

It may be appreciated that the dependency information stored in secondary storage can be retrieved and used when an indication (that a program file has been modified) is received. It may be further appreciated that the dependency information needs to be updated for only the modified program files thereby reducing the computational requirements associated with maintaining the dependency information.

To implement steps 240 and 260, CPU 110 on receiving an indication about the modified program files, may retrieve the dependency information from secondary storage and generate the hierarchy (of FIG. 3B) from the dependency information. CPU 110 identifies all the child nodes of the node corresponding to each modified program file by examining the data of FIG. 3C stored in the secondary storage. The program files corresponding to the identified child nodes (incorporating files) are identified for recompilation.

For example, when CPU 110 receives an indication that file c.h 330 (incorporated file) has been modified, CPU 110 generates the hierarchy and identifies node c.h 370 as the node corresponding to the modified file c.h 330. CPU 110 then identifies the child nodes d.c 375 and e.c 380 of node c.h 370, and their corresponding program files d.c 340 and e.c 350 (incorporating files) for recompilation. Both the modified files (file c.h 330) and the corresponding identified files (file d.c 340 and file e.c 350) are recompiled and the executable file is generated.

The above example describes the generation of executable file when some program files incorporate other program files unconditionally. On the other hand several programming languages support conditional incorporation of program files and the approaches described above may need to be extended to support such constructions.

For example, in C programming language, a user may define various flags (e.g., "#define FLAG") and then include conditional instructions (":#ifdef FLAG . . . #endif") for controlling the incorporation of files only upon the flag being defined. Assuming a include ("#include <filename>") instruction is contained in the body of an ifdef construct (":#ifdef FLAG . . . #endif",), the "filename" program file is incorporated only the "FLAG" is defined in the environment. The features of the present invention in such a context are illustrated with an example below.

5. Example of Conditional Incorporation

Figure 4A:
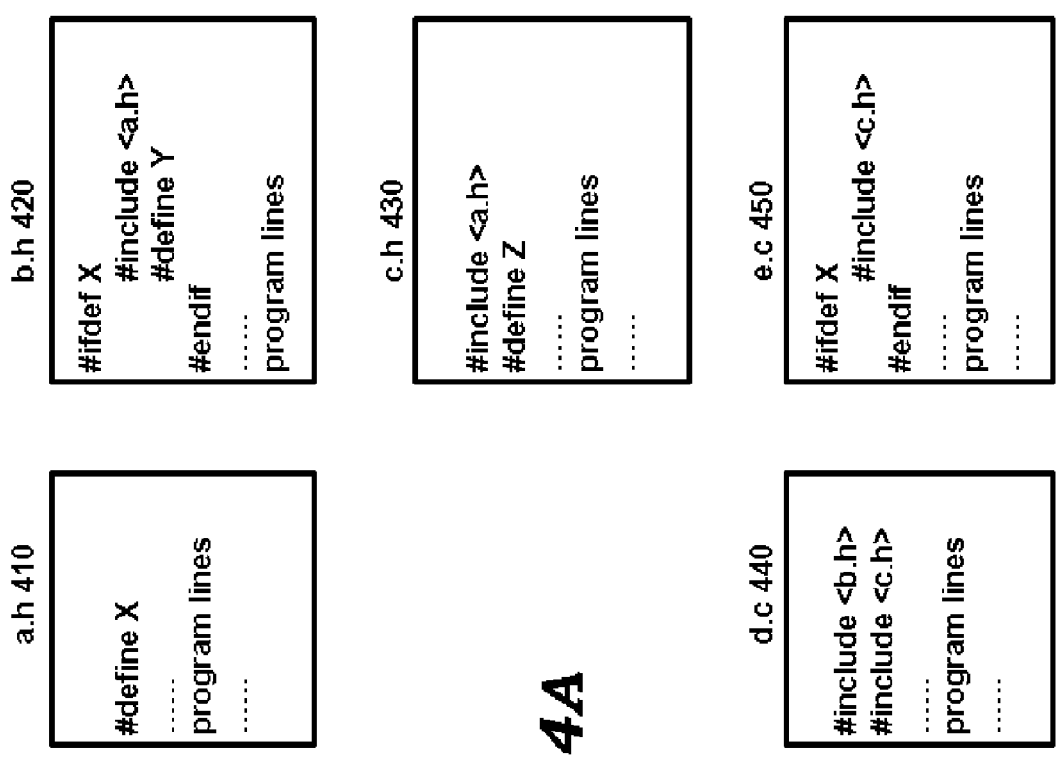
FIG. 4A depicts the contents of some program files used to generate an executable file, which conditionally incorporate other files in an example scenario.

FIG. 4A depicts the contents of some program files used to generate an executable file, which conditionally incorporate other files in an example scenario according to another aspect of the present invention. The figure contains program files a.h 410, b.h 420, c.h 430, d.c 440 and e.c 450 containing instructions written in C programming language.

The file b.h 420 contains the instruction "#ifdef X #include <a.h> #define Y #endif" implying that the contents of file a.h 410 must be incorporated into file b.h 420 only when the flag "X" has been defined thereby specifying a conditional dependency of b.h 420 (incorporating file) on file a.h 410 (incorporated file) (or that b.h 420 conditionally incorporates a.h 410). Similarly, the other dependencies (for files c.h 430, d.c 440 and e.c 450) are also generated.

Step 210 needs to be extended to handle such conditional incorporation. Each of the program files is parsed to determine not only all the "#include <filename>" instructions but also the "#define FLAG" instructions and the "#ifdef FLAG . . . #endif" instructions that enclose the "#include" instructions.

Figures 4B, 4C:
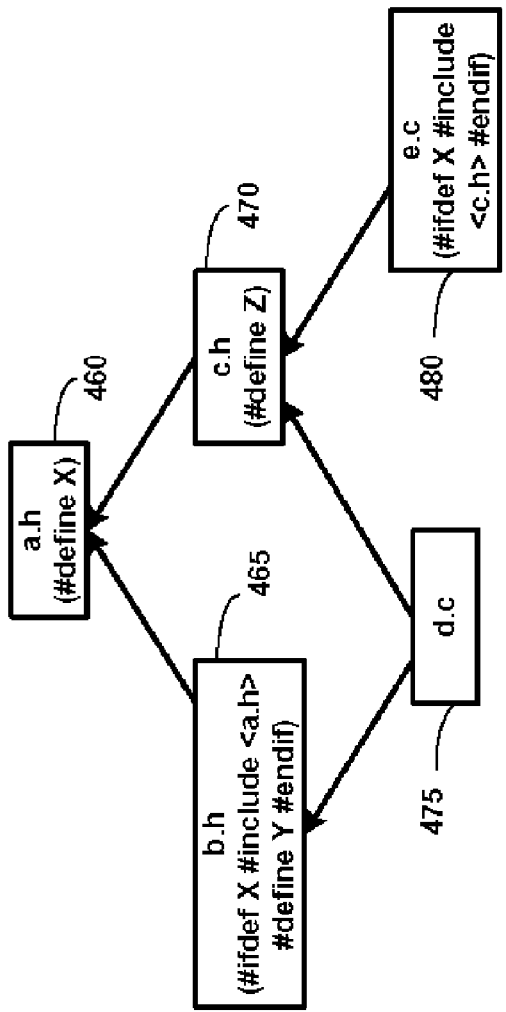
FIG. 4B depicts a hierarchy based on the dependency information generated from the program files of FIG. 4A.
FIG. 4C depicts the contents of a file stored in secondary storage containing the conditional dependency information generated from the program files of FIG. 4A according to an example convention/format.

FIG. 4B depicts a hierarchy based on the dependency information generated from the program files of FIG. 4A due to the execution of such extended step 210. The figure contains nodes a.h 460, b.h 465, c.h 470, d.c 475 and e.c 480. The hierarchy is generated from the dependency information as described above in detail. Each node in the hierarchy is also associated with the text (obtained from the extended step 210) of all the "#define" and "#ifdef" instructions contained in the corresponding file of the node (to the extent applicable). Thus, nodes a.h 460 and b.h 465 are shown with the corresponding text.

FIG. 4C depicts the contents of a file stored in secondary storage containing the conditional dependency information generated from the program files of FIG. 4A according to an example convention/format. Each node of the hierarchy of FIG. 4B is represented as described in detail above with respect to FIG. 3C. The detail of the text (conditional information) associated with each node is also stored after the file path in secondary storage. For example, lines 491-492 and 493-495 respectively represent the details of nodes b.h 465 and c.h 470 in secondary storage.

The description is continued with respect to the manner in which the information of FIGS. 4B and 4C is used for identifying the program files for recompilation in step 260 noted above.

6. Identifying Program Files in case of Conditional Incorporation

Step 240 needs to be extended to handle conditional incorporation. CPU 110 besides receiving an indication that program file has been modified, also receives a list of flags that have been defined. In an embodiment, the list of flags may be received by parsing a make file (containing flag definitions as options) used to generate the executable file from the program files or the list of flags may be specified in a configuration file. For example, when CPU 110 receives an indication that file c.h 430 (incorporated file) has been modified, CPU 110 may generate the hierarchy and identifies node c.h 470 as the node corresponding to the modified file c.h 430. CPU 110 also receives a list of flags, which are maintained in RAM 120.

Step 260 needs to be extended to handle conditional incorporation. CPU 110 identifies all the child nodes of the node corresponding to the modified file. The text associated with the nodes corresponding to modified program files and the identified child (any number of levels down) nodes, is retrieved and parsed to identify the "#define" and "#ifdef" instructions. When a "#define FLAG" instruction is identified in the associated text, the "FLAG" is added to the list of flag maintained in RAM 120. When the "#ifdef FLAG" instruction is identified, the list of flags is checked for "FLAG" and if "FLAG" is found, the child node is identified for recompilation.

For example, continuing with the above example in which file c.h 430 has been modified, node c.h 470 (corresponding to file c.h 430 in the hierarchy) associated with the text "#define Z" is parsed to identify flag "Z", which is added to the list of flags maintained in RAM 120. CPU 110 then identifies the child nodes d.c 475 and e.c 480 of node c.h 470, and parses the text associated with each node to verify any conditional dependencies. In this example, node e.c 480 is associated with the text "#ifdef X #include <c.h> #endif" which specifies a conditional dependency between node e.c 480 and node c.h 470 based on the flag "X".

If flag "X" is not defined (in the list maintained in RAM 120), node e.c 480 is not included in the list of nodes identified for recompilation. In general, if the evaluation of the condition does not require the incorporation of the conditionally incorporated program file, the corresponding incorporating program file is not identified for recompilation.

As explained in detail above, CPU 110 generates the executable file after recompiling the identified files. The features thus described above can be implemented in various types of embodiments. The description is continued with respect to an example implementation.

7. Example Implementation

Figure 5:
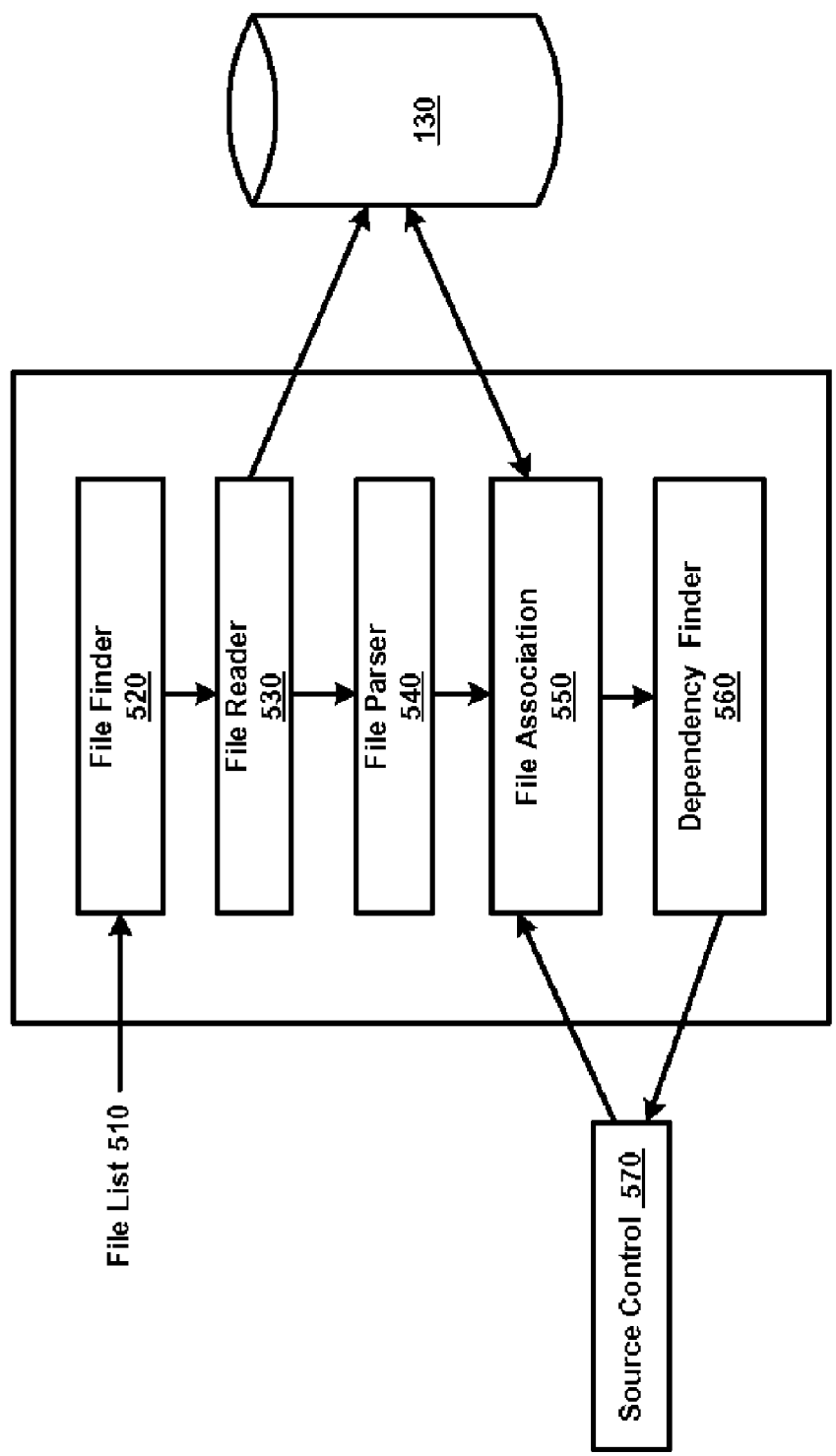
FIG. 5 is a block diagram illustrating an example implementation in which several aspects of the present invention are implemented.

FIG. 5 is a block diagram illustrating an example implementation in which several aspects of the present invention are implemented. The figure contains file list 510, file finder 520, file reader 530, file parser 540, file association 550, dependency finder 560 and source control 570. It should be appreciated that the activities illustrated are part of an example implementation and may be implemented in software or hardware and they may be performed in sequence or in parallel.

File list 510 contains a list of file identifiers identifying the program files (as depicted in FIG. 3A or FIG. 4A) used to generate the executable file. In an embodiment, file list 510 may be in the form of a list of file names and may be received from input interface (e.g., combination of a display device, mouse and key-board) or from secondary storage.

File finder 520 receives file list 510 and uses it to identify the files in the underlying file system and passes the information to file reader 530. In an embodiment, file finder 520 may search for each file name in the underlying file system and retrieve the actual location or path of the file, which is then passed to file reader 530.

File reader 530 receives the information about the files from file finder 520 and reads the content of the files from secondary storage 130. The content of the files is then passed to file parser 540. In an embodiment, a circular queue may be implemented between file reader 530 and file parser 540. File reader 530 adds the content of each file to the queue, while file parser 540 removes each file from the queue for processing.

File parser 540 receives the content of each file from file reader 530 and parses the content to identify instructions specifying the incorporation of other program files (identified by file identifiers in file list 510) in the parsed file. File parser 540 also identifies any instructions that are used to specify conditional incorporation of other program files. The identified instructions are passed to file association 550.

File association 550 receives instructions from file parser 540 for each file and generates the dependency information in the form of a hierarchy (as depicted in FIG. 3B or FIG. 4B in the case of conditional dependency) in memory. After file association 550 has processed all the files (according to file list 510), the dependency information is stored in secondary storage 130 (as depicted in FIG. 3C or FIG. 4C).

File association 550 receives an indication from source control 570 that some program files have been modified. In an embodiment, the indication may be in the form of a list of file names (each name identifying a program file). On receiving the indication, file association 550 retrieves the dependency information from secondary storage 130, generates a hierarchy and passes the hierarchy and the modified program files to dependency finder 560.

Dependency finder 560 receives the hierarchy representing the dependency information and the modified program files and identifies all the program files that need to be recompiled (in response to change of an incorporated file) by using the dependency information (using the approaches described in sections above). Dependency finder 560 may then send the list of identified program files to source control 570.

Source control 570 may change the modification date of each file identified by dependency finder 560. The change causes automatic recompilation of the identified files (and the modified files) during the generation of the executable file (due to the manner in which make type utilities operate).

Thus, due to the use of the dependency information, only the modified files and the incorporating files are recompiled, and the executable file is generated accurately. Due to the storing of the dependency information in the secondary storage, the information generated once can be maintained and used multiple times extending over large durations (thereby reducing computational requirements).

8. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Also, the various aspects, features, components and/or embodiments of the present invention described above may be embodied singly or in any combination in a data storage system such as a database system.

What is claimed is:

1. A method of generating an executable file, said method comprising:
    receiving a set of program files, wherein each program file incorporates a corresponding subset of program files contained in said set of program files, wherein a second program file of said program files includes a conditional incorporate statement to incorporate a first program file during compilation upon satisfaction of a corresponding condition and to not incorporate said first program file otherwise during compilation, wherein said corresponding condition is based on whether a first flag is defined;
    parsing at least some of said program files to generate a dependency information associating each program to said corresponding subset of program files, said dependency information associating said first program file and said corresponding condition to said second program file in response to parsing of said conditional incorporate statement in said second program file,
    wherein said condition and said first flag are specified as a part of said conditional incorporate statement present inside said second program file prior to said parsing;
    receiving an indication that said first program file has been modified;
    identifying a second subset of program files required to be recompiled in response to modification of said first program file based on said dependency information, wherein said second subset of program files contains a subset of program files associated with said first program file according to said dependency information,
    wherein said identifying further comprises determining by examining said dependency information that said first program file is incorporated in said second program file based on said corresponding condition, evaluating said corresponding condition to determine whether said corresponding condition is satisfied or not, and including said second program file in said subset of program files only if said corresponding condition is determined to be satisfied;
    compiling each of said second subset of program files to generate corresponding one of a second subset of compiled files;
    building said executable file from said second subset of compiled files; and
    maintaining a list of flags that are defined associated with said compiling and said building,
    wherein said second program file is recompiled if said corresponding condition is satisfied according to said evaluating and not recompiled otherwise,
    wherein the instructions contained in said first program file are included in the compiled file corresponding to the second program file if said corresponding condition is satisfied such that the instructions contained in said first program file are present in the compiled file, and are not included if said corresponding condition is not satisfied,
    wherein said evaluating determines whether said corresponding condition is satisfied by checking whether said first flag is contained in said list of flags,
    wherein the decision to include the instructions contained in said first program file into the compiled file corresponding to said second program file is based on whether said first flag is present or not in said list of flags.

2. The method of claim 1, further comprising storing said dependency information in a secondary storage, wherein said identifying causes said dependency information to be retrieved from said secondary storage to identify said second subset of program files.

3. The method of claim 1, further comprising marking said second subset of program files as candidates for compiling, wherein said compiling compiles only program files marked for compiling.

4. The method of claim 3, wherein said marking comprises changing a modified date associated with each of said second subset of program files.

5. The method of claim 1, wherein said conditional incorporate statement is a control statement directed to a compiler according to a programming language, wherein said control statement is defined to cause the compiler to check whether said first flag is defined or not, and to incorporate one or more additional program files including said first program file, upon satisfaction of the conditional definition of the first flag based on said list of flags defined associated with said compiling and said building.

6. The method of claim 1, wherein said dependency information is represented as a hierarchy in which said second subset of program files are represented as children of said first program file.

7. The method of claim 1, wherein said receiving said indication is received from a source control program.

8. A non-transitory computer readable storage medium carrying one or more sequences of instructions for causing a system to generate an executable file wherein execution of said one or more sequences of instructions by one or more processors contained in said system causes said system to perform the actions of:
    receiving a set of program files, wherein each program file incorporates a corresponding subset of program files contained in said set of program files, wherein a second program file of said program files includes a conditional incorporate statement to incorporate a first program file during compilation upon satisfaction of a corresponding condition and to not incorporate said first program file otherwise during compilation, wherein said corresponding condition is based on whether a first flag is defined;
    parsing at least some of said program files to generate a dependency information associating each program to said corresponding subset of program files, said dependency information associating said first program file and said corresponding condition to said second program file in response to parsing of said conditional incorporate statement in said second program file,
wherein said condition and said first flag are specified as a part of said conditional incorporate statement present inside said second program file prior to said parsing;
receiving an indication that said first program file has been modified;
identifying a second subset of program files required to be recompiled in response to modification of said first program file based on said dependency information, wherein said second subset of program files contains a subset of program files associated with said first program file according to said dependency information,
wherein said identifying further comprises determining by examining said dependency information that said first program file is incorporated in said second program file based on said corresponding condition, evaluating said corresponding condition to determine whether said corresponding condition is satisfied or not, and including said second program file in said subset of program files only if said corresponding condition is determined to be satisfied;
compiling each of said second subset of program files to generate corresponding one of a second subset of compiled files; and
building said executable file from said second subset of compiled files; and
maintaining a list of flags that are defined associated with said compiling and said building,
wherein said second program file is recompiled if said corresponding condition is satisfied according to said evaluating and not recompiled otherwise,
wherein the instructions contained in said first program file are included in the compiled file corresponding to the second program file if said corresponding condition is satisfied such that the instructions contained in said first program file are present in the compiled file, and are not included if said corresponding condition is not satisfied,
wherein said evaluating determines whether said corresponding condition is satisfied by checking whether said first flag is contained in said list of flags,
wherein the decision to include the instructions contained in said first program file into the compiled file corresponding to said second program file is based on whether said first flag is present or not in said list of flags.

9. The non-transitory computer readable storage medium of claim 8, further comprising storing said dependency information in a secondary storage, wherein said identifying causes said dependency information to be retrieved from said secondary storage to identify said second subset of program files.

10. A digital processing system comprising:
a processor;
a random access memory (RAM); and
a machine readable medium to store a set of instructions which when retrieved into said RAM and executed by said processor is designed to cause said digital processing system to perform the actions of:
receiving a set of program files, wherein each program file incorporates a corresponding subset of program files contained in said set of program files, wherein a second program file of said program files includes a conditional incorporate statement to incorporate a first program file during compilation upon satisfaction of a corresponding condition and to not incorporate said first program file otherwise during compilation, wherein said corresponding condition is based on whether a first flag is defined;
parsing at least some of said program files to generate a dependency information associating each program to said corresponding subset of program files, said dependency information associating said first program file and said corresponding condition to said second program file in response to parsing of said conditional incorporate statement in said second program file,
wherein said condition and said first flag are specified as a part of said conditional incorporate statement present inside said second program file prior to said parsing;
receiving an indication that said first program file has been modified;
identifying a second subset of program files required to be recompiled in response to modification of said first program file based on said dependency information, wherein said second subset of program files contains a subset of program files associated with said first program file according to said dependency information,
wherein said identifying further comprises determining by examining said dependency information that said first program file is incorporated in said second program file based on said corresponding condition, evaluating said corresponding condition to determine whether said corresponding condition is satisfied or not, and including said second program file in said subset of program files only if said corresponding condition is determined to be satisfied;
compiling each of said second subset of program files to generate corresponding one of a second subset of compiled files;
building said executable file from said second subset of compiled files; and
maintaining a list of flags that are defined associated with said compiling and said building,
wherein said second program file is recompiled if said corresponding condition is satisfied according to said evaluating and not recompiled otherwise,
wherein the instructions contained in said first program file are included in the compiled file corresponding to the second program file if said corresponding condition is satisfied such that the instructions contained in said first program file are present in the compiled file, and are not included if said corresponding condition is not satisfied,
wherein said evaluating determines whether said corresponding condition is satisfied by checking whether said first flag is contained in said list of flags,
wherein the decision to include the instructions contained in said first program file into the compiled file corresponding to said second program file is based on whether said first flag is present or not in said list of flags.

11. The digital processing system of claim 10, wherein said conditional incorporate statement is a control statement directed to a compiler according to a programming language, wherein said control statement is defined to cause the compiler to check whether said first flag is defined or not, and to incorporate one or more additional program files including said first program file, upon satisfaction of the conditional definition of the first flag based on said list of flags defined associated with said compiling and said building.

* * * * *

UNITED STATES PATENT AND TRADEMARK OFFICE
CERTIFICATE OF CORRECTION

| | | |
|---|---|---|
| PATENT NO. | : 8,151,253 B2 | Page 1 of 1 |
| APPLICATION NO. | : 11/308800 | |
| DATED | : April 3, 2012 | |
| INVENTOR(S) | : Sharma et al. | |

It is certified that error appears in the above-identified patent and that said Letters Patent is hereby corrected as shown below:

On Front Page, below field (22) insert -- (30) Foreign Application Priority Data Mar. 27, 2006   (IN)   ................................ 548/CHE/2006 --

Signed and Sealed this
Seventeenth Day of July, 2012

David J. Kappos
*Director of the United States Patent and Trademark Office*